(12) United States Patent
Duffield

(10) Patent No.: US 8,024,752 B2
(45) Date of Patent: Sep. 20, 2011

(54) METHOD AND APPARATUS FOR PERMITTING UNCONFIRMED VIEWING TIME WITH ADDRESSABLE PAY TV

(75) Inventor: David Jay Duffield, Indianapolis, IN (US)

(73) Assignee: Thomson Licensing, Boulogne Cedex (FR)

( * ) Notice: Subject to any disclaimer, the term of this patent is extended or adjusted under 35 U.S.C. 154(b) by 1250 days.

(21) Appl. No.: 10/482,085

(22) PCT Filed: Jun. 29, 2001

(86) PCT No.: PCT/US01/20844
§ 371 (c)(1),
(2), (4) Date: Dec. 22, 2003

(87) PCT Pub. No.: WO03/003740
PCT Pub. Date: Jan. 9, 2003

(65) Prior Publication Data
US 2004/0210924 A1 Oct. 21, 2004

(51) Int. Cl.
*H04N 7/16* (2011.01)
(52) U.S. Cl. .................. 725/25; 725/8; 725/31
(58) Field of Classification Search ............. 725/8, 25, 725/30
See application file for complete search history.

(56) References Cited

U.S. PATENT DOCUMENTS

| | | | | |
|---|---|---|---|---|
| 4,947,244 | A * | 8/1990 | Fenwick et al. | 725/82 |
| 6,157,719 | A * | 12/2000 | Wasilewski et al. | 380/210 |
| 6,177,930 | B1 * | 1/2001 | Chernock et al. | 715/716 |
| 6,973,662 | B1 * | 12/2005 | Sie et al. | 725/25 |
| 7,069,579 | B2 * | 6/2006 | Delpuch | 725/135 |
| 7,310,810 | B1 * | 12/2007 | Hamada et al. | 725/91 |
| 2002/0112234 | A1 * | 8/2002 | Bacon | 725/25 |
| 2002/0120928 | A1 * | 8/2002 | Wajs | 725/25 |
| 2003/0005435 | A1 * | 1/2003 | Nelger et al. | 725/31 |
| 2007/0124753 | A1 * | 5/2007 | Yamaguchi et al. | 725/8 |

FOREIGN PATENT DOCUMENTS

| | | |
|---|---|---|
| JP | 2000-101984 | 4/2000 |
| WO | 96/06504 | 2/1996 |
| WO | 98/43425 | 10/1998 |
| WO | 98/43428 | 10/1998 |
| WO | 99/07150 | 2/1999 |
| WO | WO 01/30082 A1 | 4/2001 |

OTHER PUBLICATIONS

Search report dated Feb. 22, 2002.

* cited by examiner

*Primary Examiner* — William Trost, IV
*Assistant Examiner* — Robert Hance
(74) *Attorney, Agent, or Firm* — Robert D. Shedd; Paul P. Kiel

(57) ABSTRACT

A method for managing access to a signal representative of an event of a service provider by permitting a subscriber of the service provider to view an event for which the subscriber is not authorized for a specified time period; and transmitting at least one authorization code for the event to the subscriber during the specified time period.

16 Claims, 1 Drawing Sheet

METHOD AND APPARATUS FOR PERMITTING UNCONFIRMED VIEWING TIME WITH ADDRESSABLE PAY TV

This application claims the benefit, under 35 U.S.C. §365 of International Application PCT/US01/20844, filed Jun. 29, 2001, which was published in accordance with PCT Article 21(2) on Jan. 9, 2003 in English.

FIELD OF THE INVENTION

This invention relates generally to conditional access systems, and more particularly to a system for providing conditional access to a received scrambled audio/visual (A/V) signal from a variety of sources, such as broadcast television networks, cable television networks, digital satellite systems, and internet service providers.

BACKGROUND OF THE INVENTION

Today, a user may receive services from a variety of service providers, such as broadcast television networks, cable television networks, digital satellite systems, and internet service providers. Most television receivers are capable of receiving unscrambled information or programs directly from broadcast and cable networks. Cable networks providing scrambled (or encrypted) programs usually require a separate stand alone set-top box to descramble the program. Similarly, digital satellite systems usually provide scrambled programs that also require the use of a set-top box (STB). These set-top boxes may utilize a removable smart card which contains the keys necessary for recovering the descrambling keys.

Conditional access (CA) systems allow users access to certain programs offered by broadcasters, cable providers, internet service providers and digital satellite providers. In the case of cable and satellite providers, such programs (e.g., Home Box Office (HBO), Pay Per View channels, etc.) often have additional costs above the 'basic' cable or satellite costs. Typically, authorization for such programming is updated on a monthly basis depending upon whether the user has paid for such programming for the particular month. In the case of PPV or VOD, authorizations are typically done on a per request basis (i.e., authorization is given when the channel is requested).

The current method for updating a user's authorization to receive Pay TV programs is commonly referred to as 'homing.' In a homing process, a digital device such as a set-top box (STB), digital videocassette recorder (DVCR) or digital television (DTV) includes software which 'homes' or tunes to a particular channel in order to receive the authorization for the programming. Typically, this homing is done when the user is not operating the digital device (e.g., when the user is not watching television).

Typically, the authorization is accomplished through Entitlement Management Messages (EMMs) which are sent from the service provider (e.g., cable company) to the user's digital device. For example, if the service provider receives payment for HBO for the month of July, the service provider will send an EMM authorizing HBO to the particular user's digital device (e.g., set-top box) in the month of June. Typically, a smart card within the digital device receives the EMM and processes it to authorize HBO for the month of July. If the EMM is not received in June, the first time the user attempts to view HBO in July they will be informed (preferably by a message appearing on the television screen) that they are not authorized or subscribed to that channel.

In another exemplary EMM scheme, a smart card within the digital device has a set amount of money or credit stored thereon which is debited each time a channel is authorized for a particular month. Periodically, the service provider sends an EMM which restores the full credit value to the smart card. However, if the EMM is not received, the smart card may not have enough credit to authorize a particular channel (e.g., HBO) for a particular month. This scheme avoids the problem of updating all subscriber smart cards every month, but smart cards still need to be updated on some periodic basis, thus requiring homing by the digital device.

In most cases, EMMs are sent to the subscribers utilizing a 'carousel' system. Carousel systems repeatedly send EMMs to maximize the ability of the digital devices to receive the data. Each subscriber of the system has a separate EMM which authorizes his or her particular programs and services. Further, even if two or more users of the system subscribe to the same service package, their EMMs are different. Thus, if there are 10,000 subscribers of the system, the carousel must deliver 10,000 EMMs in a given cycle.

Because Pay TV systems can have very large subscriber bases, the carousel can take quite a while to send a particular EMM. For example, a given metropolitan regional service area (e.g., Indianapolis, Ind.) may possess the following characteristics:

| | |
|---|---|
| Approximate Number of People Served | 1.5 million |
| Approximate Number of Homes | 500,000 |
| Approximate Number of Users | 187,500 (30% of homes @ 1.25 STB per home) |
| EMM Carousel Data | $1.5*10^8$ bits (800 bits per user) |
| Carousel Time | 25 minutes (1 Megabit/second) |

Thus, without using homing, a subscriber must watch HBO (or some other channel on which an EMM may be received) for at least 25 minutes in one month to be authorized to receive HBO for the next month.

To avoid this result, most modern digital devices (e.g., STBs) perform homing when the devices are not in use. However, the problem here is that the digital device must be continually powered up (even if not "on" or in operating mode) in order to receive the EMMs. Thus, a user must keep his digital device plugged in at all times, thereby increasing power demands and electricity costs.

For example, a digital device that is homing uses roughly 10-15 Watts of standby power. At an approximate rate of 10 Watts per hour for 20 hours a day, and assuming power cost of 8 cents per kilowatt hour (KWh), homing costs the average subscriber approximately 1.6 cents per day, or $5.84 per year. This amount becomes even more significant when multiplied by the number of digital devices homing in a particular service area.

Additional problems exist with present homing techniques. For example, some televisions are virtually never turned off (e.g., televisions in a bar or hotel lobby), and thus will never have time to home. Additionally, smart cards must be left in the digital devices in order for the homing process to work. Certain subscribers may want to remove their smart card when they are not using the television to prevent children from purchasing programs or watching particular channels. Further, one conditional access system could attempt to 'block' another conditional access system by consuming all the available homing time. For example, if a given user subscribes to four (4) different conditional access systems, four different service providers will be attempting to send four different EMMs, and thus the digital device may have to choose between which one to receive (or 'home' to) first. Finally, digital devices with multiple slots for receiving smart cards must arbitrate between conditional access systems when they are in the 'off' mode. Therefore, it is clear that conventional conditional access systems consume too much time and energy for homing.

Thus, there is presently a need for a digital device that allows a user to have a specified unconfirmed viewing time in which to allow the digital device to perform homing.

SUMMARY OF THE INVENTION

The present invention is a method for managing access to a signal representative of an event of a service provider by permitting a subscriber of the service provider to view an event for which the subscriber is not authorized for a specified time period; and transmitting at least one authorization code for the event to the subscriber during the specified time period.

DETAILED DESCRIPTION

Figure 1:
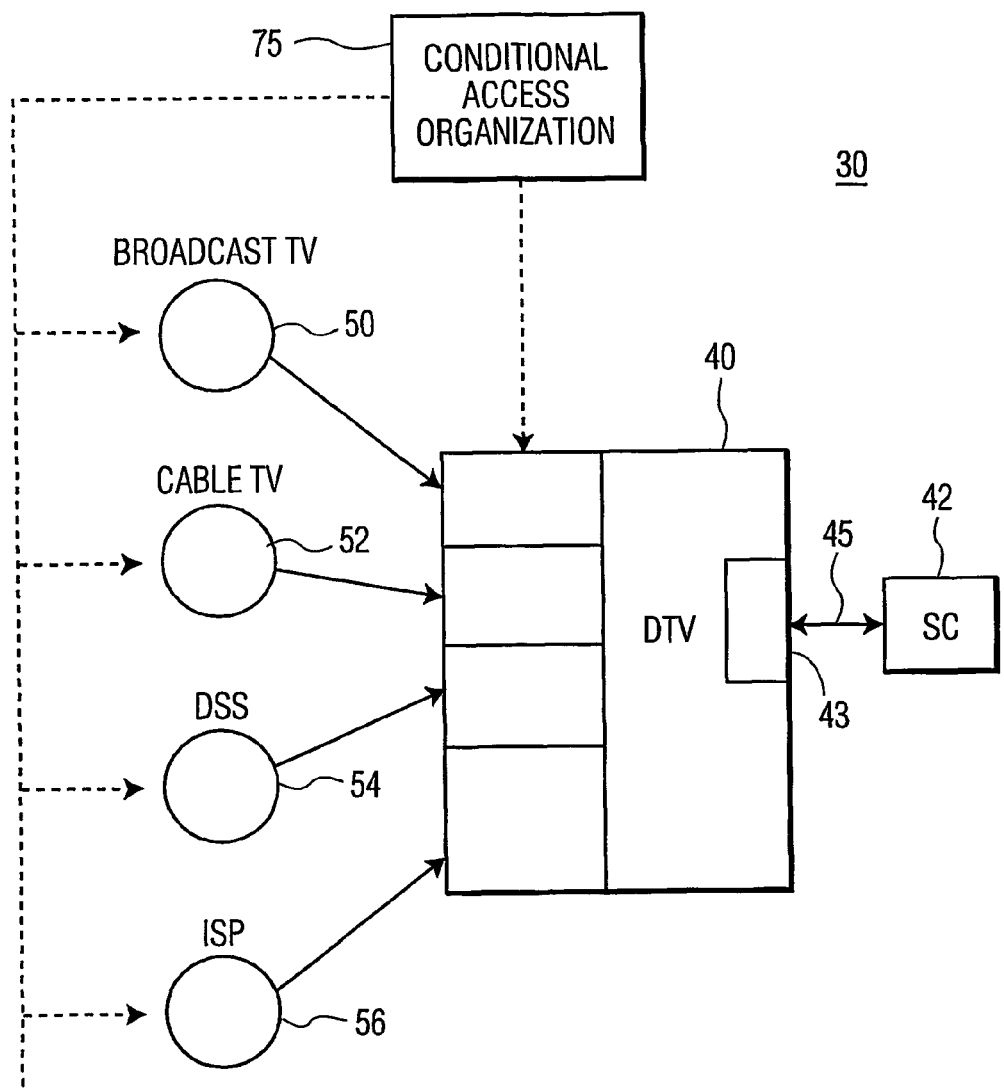
FIG. 1 is a block diagram illustrating one architecture for interfacing a digital device, such as a digital television, with a variety of service providers.

The present invention provides a conditional access system which may be utilized to obtain services from one of a plurality of sources (e.g., broadcast television networks, cable television networks, digital satellite systems, and internet service providers). The conditional access system when implemented within a digital device, such as a digital television (DTV), digital videocassette recorder (DVCR) or set-top box (STB), provides convenient management of the descrambling keys. For simplicity, the below description of the invention will be directed towards an implementation using a digital television and a smart card.

In FIG. 1, system 30 depicts the general architecture for managing access to a digital television (DTV) 40. Smart Card (SC) 42 is inserted into, or coupled to, a smart card reader 43 of DTV 40; an internal bus 45 interconnects DTV 40 and SC 42 thereby permitting the transfer of data therebetween. Such smart cards include ISO 7816 cards having a card body with a plurality of terminals arranged on a surface in compliance with National Renewable Security Standard (NRSS) Part A or PCMCIA cards complying with NRSS Part B. Such smart cards also include ISO 7816 cards, PCMCIA cards, NRSS Part A and Part B cards, Open Cable Point of Deployment (POD) modules, Digital Video Broadcast (DVB) Common Interface (CI) modules and other proprietary designs known to those skilled in the art. Conceptually, when such a smart card is coupled to a smart card reader, the functionality of the smart card may be considered to be a part of the functionality of the device (e.g., DTV 40) thus removing the "boundaries" created by the physical card body of the smart card.

DTV 40 can receive services from a plurality of service providers (SPs), such as a broadcast television SP 50, a cable television SP 52, a satellite system SP 54, and an internet SP 56. Conditional Access Organization (CA) 75 is not directly connected to either the service providers or STB 40 but deals with key management and issues keys which may be used.

As explained above, the current method for updating a user's authorization to receive programs from the service providers is commonly referred to as 'homing.' In a homing process, a digital device, such as a DTV 40, includes software which 'homes' or tunes to a particular channel of the service provider in order to receive the authorization for the programming. Typically, this homing is done when the user is not operating the digital device (i.e., when the user is not watching television). As also described above, the authorization typically comes in the form of Entitlement Management Messages (EMMs) which are sent from the service provider (e.g., cable company) to the user's digital device (e.g., DTV 40) during the homing process.

According to a first exemplary embodiment of the present invention, the DTV 40 includes software that provides a message to a subscriber asking the subscriber if they would like to perform homing. For example, instead of requiring the DTV 40 to independently perform homing functions, the DTV includes software which displays a message towards the end of the authorization period (e.g., month) for a particular pay program (e.g., HBO), asking the subscriber if they would like to home and get their EMM for the next authorization period. Although the authorization period may sometimes be a month, it will be noted by those skilled in the art that the authorization period may be any length of time (e.g., second, hour, day, week etc.).

If the user selects to home at that time, the DTV 40 requests the new EMM from the service provider, and the EMM is received by the smart card 42 in the DTV shortly thereafter. Once the homing has been completed, the subscriber may be prompted with an optional additional message indicating that it is acceptable to turn off the DTV 40. Alternatively, the DTV 40 may turn itself off after the homing has been completed. The authorization message may be displayed at any time during the authorization period, but is preferably displayed towards the end of the authorization period, when the subscriber is either turning the DTV 40 on or off.

According to a second exemplary embodiment of the present invention, the smart card 42 includes software that provides the subscriber a set amount of unconfirmed viewing time before the Pay TV, PPV or VOD channel is disabled. Typically, the amount of unconfirmed viewing time should be slightly longer than the carousel rate of the EMM carousel. For example, in the Indianapolis area example given in the Background section of the present application, it will take approximately 25 minutes for a subscriber to receive his or her particular EMM if the subscriber tunes to the channel at a point in time immediately after the carousel has issued the EMM for the particular channel. Thus, if a provider were to set the unconfirmed viewing time to approximately 30 minutes, they would virtually ensure that the subscriber would receive their EMM.

It should be noted that the unconfirmed viewing time may comprise any time period acceptable to the service provider. Although a time period of 30 minutes may in some cases be ideal, time periods of anywhere from 1 second to 10 hours (and in some cases less than 1 second and more than 10 hours) may be utilized.

To put this scheme in perspective, consider the following example. Subscriber A paid for, but did not watch a pay channel (e.g., HBO) in a particular authorization time period (e.g., January), and therefore did not receive his EMM for the next authorization time period. In the next month or authorization time period (e.g., February), Subscriber A tunes to HBO, and although not technically authorized, is permitted to watch for a set unconfirmed viewing time period (e.g., 30 minutes). If the carousel rate is less than the unconfirmed viewing time period, Subscriber A will receive his EMM for February while he is watching.

Of course it is entirely possible that a subscriber will watch intermittently for short periods of time (i.e., periods of time less than the carousel rate), such that the EMM is never received. For example, using the above scenario, assume that Subscriber A again pays for, but does not watch HBO in January. Then, in February, Subscriber A watches HBO six (6) different times for only five (5) minutes each time. In such a scenario, Subscriber A has used up his unconfirmed viewing time (i.e., 6*(5 minutes)=30 minutes), but might not have received his EMM for February.

The likelihood of such a problem occurring can be significantly reduced or eliminated by either (a) increasing the unconfirmed viewing time, or (b) transmitting multiple EMMs on multiple channels (e.g., transmitting the EMMs for HBO on HBO, Showtime, Cinemax, Starz, etc.), thus increasing the chances that the subscriber will watch one of the channels for sufficient time to receive his EMM. The unconfirmed viewing time period may be increased to any limit acceptable to the service provider (e.g., 1 hour, 2 hours, 5 hours, etc.), and is not necessarily dependent upon the length of programs which may be viewed on the channel or channels to which the subscriber subscribes.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

The invention claimed is:

1. A method for managing access to a signal representative of an event of a service provider, said method comprising:
    enabling an access device to process the signal and access the event which has an authorization code associated therewith, and for which the access device does not have the authorization code, for an authorization acquisition period independent of the signal's content, to provide a set amount of unconfirmed viewing time during which the access device can acquire the authorization code, wherein access to the content is purchased prior to the step of enabling; and
    transmitting at least one authorization code for current authorization period to the access device during the authorization acquisition period, the at least one authorization code enabling the access device to continue accessing the event beyond the authorization acquisition period;
    wherein said transmitting is performed automatically and not in response to a request for authorization from the access device during the authorization acquisition period.

2. The method of claim 1 wherein said at least one authorization code comprises at least one entitlement management message.

3. The method of claim 1 wherein said step of transmitting further comprises: transmitting the at least one authorization code to a smart card disposed in a access device.

4. The method of claim 1, wherein said authorization acquisition period is greater than or equal to a carousel rate of a data carousel which transmits the authorization code.

5. The method of claim 1, wherein said at least one authorization code comprises at least two authorization codes, said at least two authorization codes being provided on separate channels and both providing authorization for the event.

6. A system for managing access to a signal representative of a channel of a service provider, comprising:
    a device having a smart card coupled thereto, said device being enabled to process the signal and access the channel which has an authorization code associated therewith, and for which the device does not have the access code for an authorization acquisition period independent of the signal's content, to provide a set amount of unconfirmed viewing time during which the access device can acquire the authorization code; and
    means for transmitting at least one authorization code for the current authorization period to the device during the authorization acquisition period, the at least one authorization code enabling the device to continue processing the signal and accessing the channel beyond the authorization acquisition period, wherein the means for transmitting transmits authorization codes associated with content purchased prior to the authorization acquisition period;
    wherein said transmitting is performed automatically and not in response to a request for authorization from the access device during the specified time period.

7. A system for managing access to a signal representative of a channel of a service provider, comprising:
    at least one service provider; and,
    a digital device for receiving said signal;
    wherein said digital device includes software for enabling the digital device to process the signal and access the channel which has an authorization code associated therewith, and for which the digital device does not have an authorization code, for an authorization acquisition period independent of the signal's content, to provide a set amount of unconfirmed viewing time during which the access device can acquire the authorization code, wherein access to the channel by the digital device has been purchased prior to access of the signal by the digital device;
    wherein the digital device does not send a request for authorization for the signal during the authorization acquisition period.

8. The system of claim 7, wherein said software discontinues access to the channel after expiration of the authorized acquisition period, unless an authorization code for the current authorization period is received by the digital device.

9. The system of claim 7, wherein said authorization acquisition period is greater than or equal to a carousel rate of a data carousel which transmits the authorization code.

10. A method for managing access to a signal representative of a channel of a service provider, said method comprising:
    setting an authorization acquisition period;
    enabling an access device to process the signal and access the channel which has an authorization code associated therewith, and for which the access device does not have the authorization code, for the authorization acquisition period independent of the signal's content, to provide a subscriber a set amount of unconfirmed viewing time, wherein access to the content is purchased prior to the step of enabling; and
    inhibiting the access device from accessing the channel, if the authorization code for the channel is not received during the authorization acquisition period;
    enabling the access device to continue accessing the channel, if the authorization code for the channel is received during the authorization acquisition period;
    wherein the access device does not send a request for authorization for the signal during the authorization acquisition period.

11. The method of claim 10, wherein said authorization acquisition period is greater than or equal to a carousel rate of a data carousel which transmits the authorization code.

12. In a conditional access system, a digital device for receiving a signal representative of a channel from at least one program service provider, said digital device including software for enabling the digital device to process the signal and access the channel which has an authorization code associated therewith, and for which the digital device does not have the authorization code, for an authorization acquisition period independent of the signal's content, to provide a set amount of unconfirmed viewing time during which the access device can acquire the authorization code, wherein access to the channel by the digital device has been purchased prior to access of the signal by the digital device;

wherein the digital device does not send a request for authorization for the signal during the authorization acquisition period.

13. The digital device of claim 12, wherein said software discontinues said event after expiration of the authorization acquisition period, unless an authorization code for said channel is received by the digital device.

14. A system for managing access to a signal representative of a channel of a service provider, wherein said signal is at least one scrambled signal, said system comprising:

a transmitter for transmitting said at least one scrambled signal and at least one authorization code for descrambling the at least one scrambled signal, wherein the transmitter transmits authorization codes associated with content purchased prior to the authorization acquisition period;

a receiver for receiving the at least one scrambled signal and the at least one authorization code, said receiver descrambling the at least one scrambled signal using the at least one authorization, the receiver enabled to process the signal and access the channel which has an authorization code associated therewith, and for which the receiver does not have the authorization code, to provide the at least one scrambled signal in unscrambled format for an authorization acquisition period independent of the signal's content before the at least one authorization code is received, to provide a set amount of unconfirmed viewing time during which the access device can acquire the authorization code;

wherein the receiver does not send a request for authorization for the signal during the authorization acquisition period.

15. A method for managing access to a signal representative of a channel of a service provider, said method characterized by:

enabling an access device to process the signal and access the channel which has an authorization code associated therewith, and for which the access device does not have the authorization code, for an authorization acquisition period independent of the signal's content, to provide a set amount of unconfirmed viewing time during which the access device can acquire the authorization code, wherein access to the content is purchased prior to the step of enabling; and receiving at least one authorization code for current authorization period in the access device during the authorization acquisition period, the at least one authorization code enabling the access device to continue accessing the channel beyond the authorization acquisition period;

wherein the access device does not send a request for authorization for the signal during the authorization acquisition period.

16. The method of claim 15, characterized in that the enabling step comprises enabling the access device to process the signal and access the channel if the access device had previously received a previous authorization code associated with a previous authorization period.

* * * * *